(12) United States Patent
Blatherwick et al.

(10) Patent No.: US 7,937,479 B2
(45) Date of Patent: May 3, 2011

(54) SYSTEM AND METHOD FOR ASSOCIATING COMMUNICATION DEVICES

(75) Inventors: Peter Blatherwick, Ottawa (CA); Hai Vu, Kanata (CA); Sonya Fullarton, Ottawa (CA); Tom Quan, Ottawa (CA); Thomas A. Gray, Mansfield (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 102 days.

(21) Appl. No.: 12/006,651

(22) Filed: Jan. 4, 2008

(65) Prior Publication Data

US 2009/0177782 A1 Jul. 9, 2009

(51) Int. Cl.
*G06F 15/16* (2006.01)
(52) U.S. Cl. ........................... 709/228; 709/227
(58) Field of Classification Search .......... 709/227–228; 340/686.6
See application file for complete search history.

(56) References Cited

U.S. PATENT DOCUMENTS

| | | |
|---|---|---|
| 6,377,987 B1 | 4/2002 | Kracht |
| 2004/0215781 A1 | 10/2004 | Pulsipher et al. |
| 2005/0059379 A1* | 3/2005 | Sovio et al. ............ 455/411 |
| 2005/0144318 A1* | 6/2005 | Chang ................... 709/245 |
| 2006/0074494 A1* | 4/2006 | McFarland ............... 700/1 |
| 2007/0171098 A1 | 7/2007 | Basart |
| 2007/0255807 A1 | 11/2007 | Hayashi et al. |
| 2007/0274234 A1 | 11/2007 | Kubota |
| 2007/0297426 A1 | 12/2007 | Haveson et al. |
| 2008/0015013 A1* | 1/2008 | Gelman et al. ........... 463/25 |

FOREIGN PATENT DOCUMENTS

| | | |
|---|---|---|
| EP | 1569384 A | 8/2005 |
| GB | 2363289 A | 12/2001 |
| WO | WO00/22860 A | 4/2000 |
| WO | WO2007121414 A | 12/2007 |

OTHER PUBLICATIONS

Amir, Arnon et al, Buddy tracking—efficient proximity detection among mobile friends; IEEE INFOCOM 2004; 0-7803-8356-7/04.
European Search Report, Mar. 12, 2010.

* cited by examiner

*Primary Examiner* — Salad Abdullahi

(57) ABSTRACT

A system and method of associating at least two communication devices is provided. First information identifying a first communication device and second information identifying a second communication device is received via a link layer protocol over a data network. It is determined if the first communication device and the second communication device are co-located based on first link layer data associated with the first communication device and second link layer data associated with the second communication device. An association is triggered between the first information and the second information if the first communication device and the second communication device are determined to be co-located.

20 Claims, 4 Drawing Sheets

SYSTEM AND METHOD FOR ASSOCIATING COMMUNICATION DEVICES

FIELD

The specification relates generally to networked devices, and specifically to a method and system for associating communication devices.

BACKGROUND

Desktop devices, such as IP phones, thin clients, PCs/laptops often need onerous configuration in order to be associated with each other. For example, in order for an IP phone on a user's desk to be associated with a communication application running on a desktop PC/laptop on the same desk, the user or an administrator often needs to configure the application with the address or DN of the phone, the address of the phone's call controller, and other details. The user may likewise need to manually enter the IP address and other details of the PC into the phone. This is a complex process for the typical user, and is also both time consuming and error prone.

Alternatively, the same information may be configured into a centralized database, an application file or similar. This leads to a large ongoing administrative effort, especially in large systems, to keep data up to date as it changes over time.

Additionally, some configuration items such as IP addresses may change occasionally, causing the association to fail and the application to not work correctly. This leads to a further ongoing data maintenance issue, and/or to occasional application failures followed by re-doing the configuration.

US Patent Application US2007/0171098 discloses a system whereby associations may occur automatically via Ethernet links and IP addresses, however this solution suffers the same disadvantages as manual associations using IP addresses: IP addresses may change occasionally, causing the association to fail and applications to not work correctly. In addition, as the system disclosed in US2007/0171098 performs an association based on a high level protocol (i.e. internet protocol), associations are possible only for devices which use that protocol. Hence, the system of US2007/0171098 lacks generality and is unable to cope with devices using other protocols to create arbitrary types of associations.

In cases where mobility is involved, the relationship between co-located devices is not long term (e.g. a user may bring a laptop to a conference room or telecommuting site, and wish to make temporary use of the desktop facilities such as the IP phone either alone or in relation to laptop-based application(s)). The configuration would need to be done again each time the user moves, and would need to be un-done at the end of a session so that resources can be reclaimed and future users cannot access the previous user's information. Again, this process is quite onerous for the end user, and error prone. Failing to log off could have security considerations.

SUMMARY

A first broad aspect of an embodiment seeks to provide a method of associating at least two communication devices coupled to a data network. The method comprises receiving first information identifying a first communication device and second information identifying a second communication device via a link layer protocol over the data network. The method further comprises determining if the first communication device and the second communication device are co-located based on first link layer data associated with the first communication device and second link layer data associated with the second communication device. The method further comprises triggering an association between the first information and the second information if the first communication device and the second communication device are determined to be co-located.

In some embodiments of the first broad aspect, the method further comprises triggering availability of at least one of an application and a feature at, at least one of the first communication device and the second communication device based on data associated with the other of the second communication device and the first communication device, if the first communication device and the second communication device are determined to be co-located. In some of these embodiments, the application comprises an auto-login application and the data associated with the other of the first communication device and the second communication device comprises log-in data. In other embodiments, the feature comprises a proximity-based feature. In some of these embodiments the proximity-based feature is enabled to modulate options offered at, at least one of the first communication device and the second communication device. In some of these embodiments, the options comprise options offered upon opening a session at least one of the first communication device and the second communication device.

In other embodiments of the first broad aspect, the method further comprises triggering a disassociation between the first information and the second information if the association is determined to have become invalid.

In further embodiments of the first broad aspect, at least one of the first link layer data and the second link layer data comprises a port ID identifying a port over which an associated communication device is communicating, the associated communication device comprising at least one of the first communication device and the second communication device.

In yet further embodiments of the first broad aspect, receiving the first information and the second information comprises receiving a neighbour info message, the neighbour info message comprising the first information and the second information, and the determining if the first communication device and the second communication device are co-located comprises determining that the neighbour info message comprises the first information and the second information.

In some embodiments of the first broad aspect, determining if the first communication device and the second communication device are co-located comprises comparing the first link layer data and the second link layer data.

In other embodiments of the first broad aspect, determining if the first communication device and the second communication device are co-located comprises looking up the first link layer data and the second link layer data in a wiremap database to determine a physical location of the first communication device and the second communication device.

In further embodiments of the first broad aspect, the method further comprises receiving the first link layer data and the second link layer data concurrent with the receiving the first information and the second information. In some of these embodiments, the method further comprises querying link layer data, the receiving the first link layer data and the second link layer data and the receiving the first information and the second information occurring in response to the querying.

In yet further embodiments of the first broad aspect, triggering an association between the first information and the second information comprises transmitting a message comprising the first information and the second information, the message configured to trigger associating the first information and the second information in at least one database.

In some embodiments of the first broad aspect, the link layer protocol comprises at least one of LLDP, LLDP-MED, CDP and STP.

In other embodiments of the first broad aspect, the method further comprises sharing location information between at least one of the first communication device and the second communication device.

A second broad aspect of an embodiment seeks to provide a system for associating at least two communication devices. The system comprises a first communication device, and a second communication device co-located with the first communication device. The system further comprises a data network for conveying information associated with at least one of the first communication device and the second communication device. The system further comprises a network access switch coupling the first communication device and the second communication device to the data network via a link layer. The system further comprises at least one server coupled to the data network, the at least one server enabled for: receiving first information identifying a first communication device and second information identifying a second communication device via a link layer protocol over the data network; determining if the first communication device and the second communication device are co-located based on first link layer data associated with the first communication device and second link layer data associated with the second communication device; and triggering an association between the first information and the second information if the first communication device and the second communication device are determined to be co-located.

In some embodiments of the second broad aspect, the at least one server is further enabled for triggering availability of an application at, at least one of the first communication device and the second communication device based on data associated with the other of the second communication device and the first communication device, if the first communication device and the second communication device are determined to be co-located.

In other embodiments of the second broad aspect, the first communication device is connected to the data network via a first link layer port having a first port ID, and the second communication device is connected to the data network via a second link layer port having a second port ID.

In further embodiments of the second broad aspect, at least one of the first communication device and the second communication device comprises a link layer switch, and the first communication device and the second communication device are connected via the link layer switch. In some of these embodiments, the link layer switch is enabled to detect neighbour information and transmit a neighbour info message comprising the first information and the second information to the at least one server.

In yet further embodiments of the second broad aspect, each of the first communication device and the second communication device comprises at least one of a thin client device, a personal computer, a laptop, a personal digital assistant, a cell phone, and a game console, and an IP enabled telephone.

In some embodiments of the second broad aspect, the system further comprises at least one database in communication with the at least one server for storing the association.

In other embodiments of the second broad aspect, the system further comprises a proximity server for storing at least one of the association and co-location data for proximity applications.

A third broad aspect of an embodiment seeks to provide a computer readable medium having computer readable code embodied therein for controlling a computer to: receive first information identifying a first communication device coupled to a data network and second information identifying a second communication device coupled to the data network via a link layer protocol over the data network; determine if the first communication device and the second communication device are co-located based on first link layer data associated with the first communication device and second link layer data associated with the second communication device; and trigger an association between the first information and the second information if the first communication device and the second communication device are determined to be co-located.

A fourth broad aspect of an embodiment seeks to provide a method of modulating activity in at least one of a first communication device and a second communication devices, comprising triggering availability of at least one of an application and a feature at, at least one of the first communication device and the second communication device based on data associated with the other of the second communication device and the first communication device, if the first communication device and the second communication device are determined to be co-located.

In some embodiments of the fourth broad aspect, the application comprises an auto-login application and the data associated with the other of the first communication device and the second communication device comprises log-in data.

In other embodiments of the fourth broad aspect, the feature comprises a proximity-based feature. In some of these embodiments, the proximity-based feature is enabled to modulate options offered at, at least one of the first communication device and the second communication device. In some of these embodiments, the options comprise options offered upon opening a session at least one of the first communication device and the second communication device. In other of these embodiments, triggering the availability is further based on determining proximity of at least one user to at least one of the first communication device and the second communication device, and.

In further embodiments of the fourth broad aspect, triggering availability is further based on determining that at least one of the first communication device and the second communication device is an unauthorized communication device.

In yet further embodiments of the fourth broad aspect, the data associated with the other of the second communication device and the first communication device comprises permission data.

In some embodiments of the fourth broad aspect, the application comprises a personal information management (PIM) application and the method further comprises making PIM data associated with at least one of the first communication device and the second communication device available to the other of the first communication device and the second communication device.

BRIEF DESCRIPTIONS OF THE DRAWINGS

Embodiments are described with reference to the following figures, in which.

DETAILED DESCRIPTION OF THE EMBODIMENTS

Figure 1:
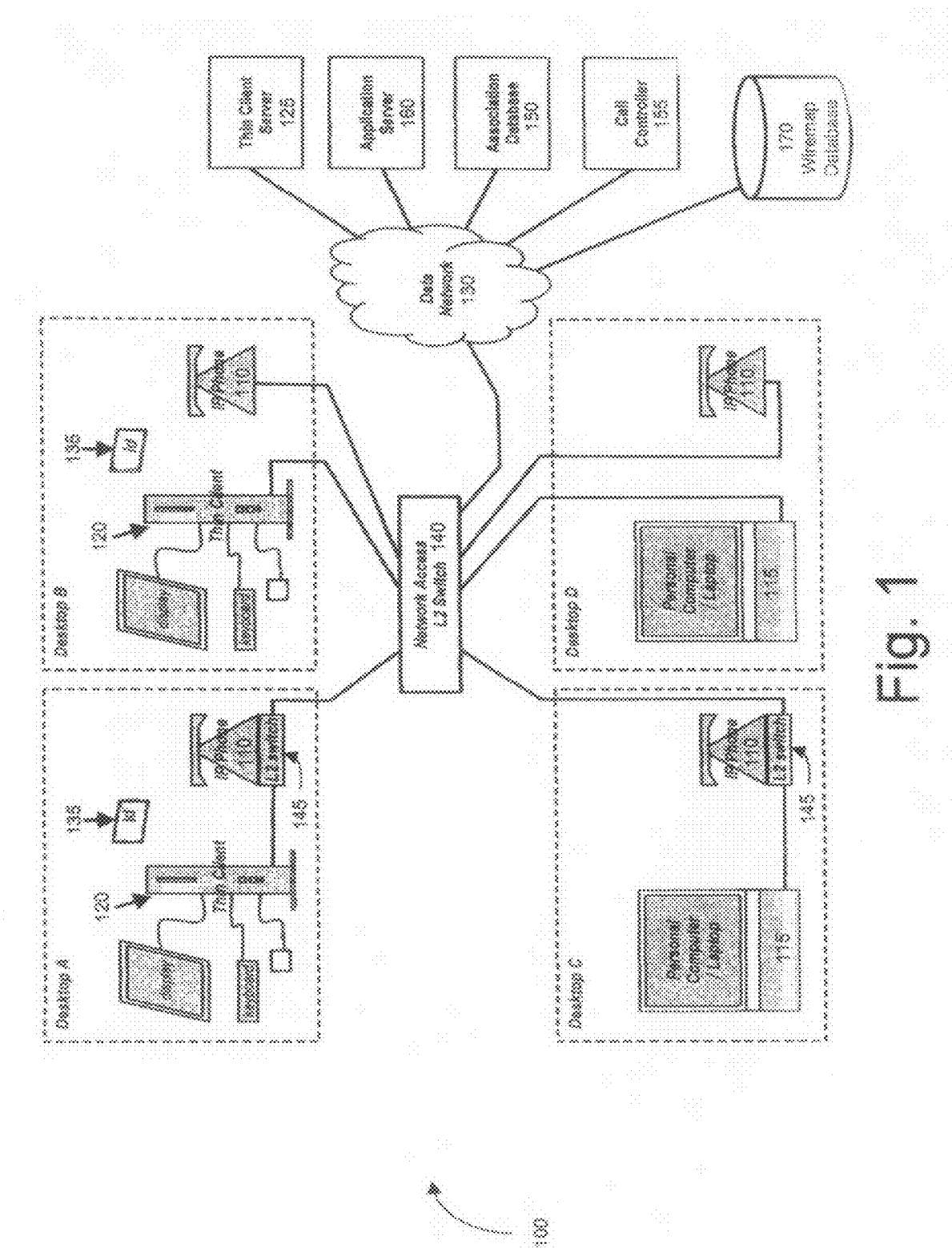
FIG. 1 depicts a system for associating networked communication devices, according to a non-limiting embodiment.

FIG. 1 depicts a system 100 for associating networked communication devices, according to a non-limiting embodiment. As shown in FIG. 1, there may be a number of end user desktops, each with a variety of co-located communication and/or computing devices available such as an IP phone 110, personal computer (PC) or laptop computer 115, or "thin client" devices 120. (A "thin client" would be understood by one of skill in the art to mean a collection of user interface devices, driven by a thin client processor device, with the actual applications running in a "thin client server" 125 elsewhere in the system. From a user perspective, the thin client 129 equivalent to a personal computer, with the exception that the application is actually running remotely across a data network 130, and only the presentation of the application is being generated locally by the thin client device 120 and its peripherals (e.g. a display, a keyboard, a mouse etc,).)

Some thin client implementations also make use of personal identity cards 135, memory keys, and the like, that identify a user to the thin client server 125 when inserted into the thin client device 120. Such identity cards 135 are also possible for use with the PC/laptops 115, other computing devices, or with communication devices such as IP phones 110.

These co-located desktop computing and/or communication devices (i.e. the thin client device 120, the IP phone 110, and/or the PC/laptop 115) are generally connected to the data network 130, such as a routed IP network, by way of some link-level connection such as Ethernet or wireless LAN. For the sake of simplicity, this is shown as a wired Ethernet connection to a network access layer 2 (L2) switch 140, which in turn connects the computing and/or communication devices to the data network 130. There are a variety of ways for these connections to be made, notably each communication device may be individually connected to the network infrastructure (Desktop B and D), or some communication devices such as PC/laptop 115 or thin client 120 may be connected through others such as IP phones (e.g. IP phone 110) comprising an embedded or attached L2 switch/bridge 145 (Desktop A and C. Additionally, these computing and/or communication devices may or may not be on the same IP subnet: that is they may be on different layer 2 VLANs, and hence may not be able to reach each other directly by use of broadcast. It is understood that computing devices which are communicating over the data network 130 comprise communication devices which enable this communication. Furthermore, communication devices will generally comprise a computing device to process the signals exchanged with the data network 130. Hence, in the following specification, the terms communication device and computing device are considered generally interchangeable, unless otherwise specified. For example, in some areas of the following description a distinction may be made between the IP phone 110, which functions primarily as a communication device, and the PC/laptop 115, or the thin client 120, either of which may function primarily as a computing device. Further references to a device are understood to mean, generically the communication and/or the computing device.

There are also in many cases servers in the network related to a communication device association process. Notable is some form of association database 150, for the purpose of tracking which communication devices are associated, their address and unique ID information, and any supplementary information as needed. In the IP phone case, there is often one or more call controller 155 (i.e. a server or servers) in the network. In these embodiments, the call controller 155 may perform the association task. In the case of thin clients on the desktop, there will also be the thin client server(s) 125 in the network. In addition, there may be one or more application servers 160, performing the association task, and possibly other applications. Note that these servers are logical entities, so they may or may not be physically integrated with each other, or with other servers in the network. Note also that while the data network 130 as depicted and described below comprises a routed IP network, this is not necessary—other protocols may be used, and a simple LAN is sufficient—as long as the communication devices and servers are reachable to each other through the networking infrastructure.

In order for applications to make use of co-located communication and/or computing devices in a unified way, the co-located devices need to be associated with each other: that is, the system 100 needs to know which of these devices are located physically together. An application that wants to perform some coordinated action on associated communication devices must also know (generally) the network addresses and unique identifiers of each.

Additionally, some or all of these communication and/or computing devices may be mobile in nature (for example laptops, PDAs, mobile phones or similar may move locations readily), and the communication devices may or may not be permanently associated with a particular user (e.g. the "desktop" may be shared by many users at various times such as in a teleworking site or automatic call distribution (ACD) agent shifts, or may be a conference room or other shared facility). Communication devices may also come and go dynamically for other reasons, such as being powered off or disconnected, or new communication devices being plugged in (e.g. plugging in a video camera to add to a conference). Thus, device associations need to be capable of being detected, established, updated and undone dynamically.

Standard link layer (or layer 2) protocols such as Link Layer Discovery Protocol (LLDP, IEEE 802.1AB-2005) or LLDP—Media Endpoint Discovery (LLDP-MED, ANSI/TIA-1057) provide considerable information to "neighbor" devices physically attached at each end of a network link. Information provided includes (not limited to) IP address and MAC address of the neighbor device, device capabilities (phone, network element, etc), device name and description, inventory description (vendor, make, model, software/firmware/hardware revision, etc). This information is highly useful to enable applications running in these devices, or running on their behalf elsewhere in the system, to associate themselves with each other.

In the case of IP phones, it is very often the case that the computing/communication device (i.e. desktop PC/laptop 115 or thin client 120) is physically plugged into the IP phone 110 directly, for example via a simple L2 switch/bridge 145, which may either be embedded in the IP phone 110 or connected to the IP phone 110. This makes it possible for a phone application to "sniff" the layer 2 protocol messages as they transit the IP phone 110 on their way between the attached computing/communication device and the network access switch infrastructure (i.e. network access L2 switch 140). Similar system configurations can be imagined in the case of the computing/communication device (or any other devices)

comprising an embedded L2 switch/bridge 145 (or alternatively connected to an L2 switch/bridge 145) which other devices connect through, allowing these to also collect information contained in the layer 2 protocol. Additionally, any or all of the devices in these connection configurations may actively transmit the layer 2 protocol to each other over the link (as opposed to just passively passing it on from the upstream access switch), allowing the set of co-located communication devices to directly communicate.

This information, collected at both the IP phone 110 and the desktop PC/laptop 115 or thin client 120 can then be sent elsewhere in the overall system, such as to the call controller 155, a shared database (such as the association database 150) or the application server 160, where it can be collated, hence the related application running in the IP phone 110 (or the call controller 155) can be automatically configured with the required information about the corresponding computing/communication device, and visa versa. Alternatively, the information can also be gathered at the network infrastructure (e.g. at the network access layer 2 switching equipment) and collected from there or sent as an automatic notification to the other elements involved.

Additionally, specific physical location information can also be associated with the communication devices, such as civic address (city/street address/floor/room number), coordinate-based geographic location (latitude/longitude/altitude), or other locally relevant indices such as wiremap wall jack number, or similar. This information may be available (e.g.) as part of network access switch configuration (e.g. as part of LLDP-MED), through higher layer protocols (e.g. Dynamic Host Configuration Protocol (DHCP), HTTP Enabled Location Delivery (HELD)), through location technology in the devices (e.g. GPS, "beacons" etc), indirectly through a mapping process such as via a pre-populated wiremap database 170, or similar, or by direct configuration of one or more of the devices. Where this information can also be associated with the communication devices, location can also be used by applications as an index to find the set of co-located computing and/or communication devices at a particular location.

Using this provided information and other protocol facilities, a set of methods is possible that allow for the auto-discovery of device associations. Each is described separately below, using LLDP-MED as the reference protocol. However, the methods are not unduly limited by the reference protocol, and other protocols are within the scope of the present specification.

As an example application of this association, "a single sign-in logon" is described, wherein a user may login to one communication device (for example the PC/laptop 115 or the IP phone 110) and, as a result, be automatically logged into the other co-located communication devices as well. A non-limiting example of this may be inserting the thin client ID card 135 into the thin client 120, and as a result being "hot-desked" to the associated IP phone 110 as well, allowing a user to begin using both communication devices immediately without further action. However, this application is not to be considered unduly limiting and other applications that may benefit from the auto-discovery of device associations (some of which are discussed below) are within the scope of the present specification.

In general, there are a wide range of possible variations on the protocols used, specific system configuration, embedding of system components within others, and the specific applications enabled by the auto-association process. Hence, the following examples are not meant to be unduly limiting and variations on the described methods of auto-discovery of device associations are within the scope of the present specification.

Link Layer Discovery Via IP Phone

A method of associating at least two communication devices coupled to the data network is now discussed with reference to FIG. 2, which depicts a message diagram for associating networked communication devices, according to a non-limiting embodiment. In this method it is assumed that the computing/communication device (PC/laptop 115 or thin client 120) is connected to the data network 130 via the L2 switch/bridge 145 embedded in the IP phone 110. The Desktop A scenario of FIG. 1 is further referenced in the following discussion. The alternative Desktop C scenario, using the PC/laptop 115, is also described.

In this embodiment, LLDP-MED is in operation on both the desktop computing device (thin client 120 or PC/laptop 115), on the IP phone 110, as well as on the network access L2 switch 140.

Step 201. Using this protocol, both the computing device and the IP phone 110 are advertising their IP address and MAC address towards the network access L2 switch 140, and the network access L2 switch 140 is advertising its address and port MAC back towards the desktop devices (however, the latter is immaterial to this scenario). Additional supplementary information may also be transmitted, such as inventory information.

Step 201a. Since the IP phone's 110 embedded L2 switch/bridge 145 is passively in the path of the messaging from the computing device, it is able to "sniff" the messaging and extract the computing device's IP address and MAC address as well as any supplementary information provided in the protocol.

Step 202. The IP phones neighbour information, regarding the attached computing device, is passed to the IP phone 110 registered call controller 155, along with any supplementary information in a "Neighbor_info" message.

Step 203. Since the IP phone 110 call controller 155 already knows the IP phone 110 IP address and MAC address (or other unique ID, see below), it is now able to collate this with the computing device's data, and sends an association message or equivalent to the association database 150, containing a mapping of computing device MAC address to IP phone MAC address (or other unique identifiers) and also the IP address of the computing device as well as of the IP phone ("Associate"). This association is stored in the association database 150 for later use by applications. At this point, the device association phase is complete, the physical device association is established, and may be used by applications to take higher-level actions. Hence, the call controller 155 effectively triggers the association between the devices by sending the association message.

Step 204. At some later time, a user inserts their identification card 135 into the computing device, or alternatively logs on to it in some other way (for example by supplying log-on credentials, such as a user name and password).

Step 205. In embodiments which comprise the thin client 120, this may result in a user login message or equivalent being sent to the thin client server 125, containing the user's user ID and the MAC address and/or IP address of the thin client 120 being accessed ("Login"). As a result, the user is logged into the thin client 120 and may begin using it.

Step 206. As a result of the login to the thin client 120, an event indicating the login occurring may be sent from the thin client server 125 to the application server 160 responsible for initiating the auto-login application to the associated IP phone 110 on the same desktop ("Login_event"). This message may contain the user's User ID, thin client MAC (or other unique ID) and possibly other data such as the thin client IP address, etc.

Step 207. The auto-login application running on the application server 160 then queries the association database 150, passing the computing device MAC (or other unique id) and possibly the user's User ID or other relevant data as keys ("Association_Query").

Step 208. The association database 150 returns the mapping of the computing device MAC to the IP phone MAC (or other unique ID pair), as previously stored in step 203 above, as well as the mapping of computing device User ID to the equivalent IP phone User ID (such as the user's personal DN ("UserDN")) ("Association_Query_response"). Other supplementary data related to one or both associated devices may also be returned.

Step 209. The auto-login application then sends a control message to the IP phone's call controller (or directly to the phone as applicable) requesting that the user be hotdesk logged into the associated IP phone, passing the IP phone MAC address (or other unique ID of the physical device), the user ID as known to the call controller (e.g. the user's hotdesk DN, or other unique user ID), and any other supplementary information needed to accomplish user login to the IP phone ("Phone_login").

Step 210. The user is auto-logged into the associated IP phone 100, and may begin using it.

Variation 1: Desktop C Scenario.

In embodiments where the computing device comprises the PC/laptop 115 (i.e. the Desktop C scenario), minor modifications to the message diagram of FIG. 2 may be as follows:

All corresponding messages would be sent and received by the PC/laptop 115 directly, rather than by the thin client server 125.

Messages described as between the thin client 110 and thin client server 125 would instead be internal to the PC/laptop 115.

Variation 2: Login to the IP Phone 110 First.

In embodiments where the user logs in to the IP phone 110 first, rather than the computing device, minor modifications to the message diagram of FIG. 2 may be as follows:

At steps 204 and 205: the user logs in (or inserts card 135 etc) at the IP phone 110.

At step 206: upon successful login, the call controller 155 sends the Login_event to the application server 160, containing the IP phone device ID (Phone MAC) and user ID (UserDN).

At steps 207-208: the application server 160 queries the association database 150, using the IP phone device ID (Phone MAC) and user ID (UserDN) as keys, and receives the thin client device ID (TC MAC) and user ID (UserID) in the response.

At steps 209-210: the application server 160 sends a login message to the thin client server 125, containing the user ID and thin client MAC, and thereby logging the user into the thin client 120.

Variation 3: the Computing Device is Connected after the IP Phone 110 Login.

In embodiments where the computing device is connected (or equivalently powered on, application started etc) after the IP phone 110 has been logged into, it may be desirable to initiate device association and deferred login to the computing device, based on prior valid login to the IP phone 110. In these embodiments, the following modifications to the above methods could be used. Note that it is not actually necessary for the IP phone 110 to be logged in for the device association to take place (i.e. steps 207-210 may not be needed below, or may be deferred, and the device association will still take place):

At steps 201-202: LLDP-MED from the computing device, and subsequent detection of neighbours, as well as sending of Neighbor_info to the call controller 155, is deferred until the computing device connects.

At step 203: triggered by the Neighbor-info, the call controller 155 sends "Associate" message to the association database 150 as before, to in turn trigger/establish the device association.

At step 206: the call controller 155 can send a deferred Login_event to the application server 160, as in described above. Alternatively, the Login_event could be sent earlier such as at time of user login to the IP Phone 110, and the Login_event stored at the application server 160, or in an appropriate database, with steps 207-210 triggered by the application server 160 based on detecting that a new association between the devices is made in the association database 150 as a result of above Associate message at step 203. In the latter alternative implementation, there are a number of methods for said detection of new association, including but not limited to polling of the association database 150 by the application server 160 or spontaneous notification of the application server 160 by the association database 150.

At steps 207-210: proceed as in embodiments where the user logs in to the IP phone 110 first.

Variation 4—Computing Device Application Started after IP Phone Login:

As a further variation on the same method, if the computing and/or communication device is connected (or equivalently powered on), however no application requiring device association is running at first, the link layer protocol may not yet have started on one or more device involved. Some link layer protocols (e.g. LLDP) can be started from the application layer; hence the application may directly or indirectly start the device association process, when necessary. This may be before or after the IP phone 110 (or the PC/laptop 115 or the thin client 120) has been logged into. This may be (as a non-limiting example) for the application to be able to use the IP phone 110 as part of its communication process, or as an adjunct for some other purpose (streaming music, text to speech, etc). A deferred login may also be initiated as previously described, if needed for the application. The following modified methods are possible in these cases.

Variation 4a—Computing Device Contacts (or Comprises) the Association Database 150.

At application start-up, the computing device (i.e. the PC/laptop 115 or the thin client 120) may contact the call controller 155 to obtain access to the association database 150, to request that it be informed of any Neighbor_info notifications, or may begin polling the association database 150 to the same purpose (possibly filter to be only those containing its device ID or IP address as part of the info). The application then starts the link layer protocol at the computing device. In these embodiments, the following variations may apply:

At steps 201-203. Proceed as in the previous variation (Variation 3), however in some embodiments, the link layer protocol may be started at the computing device (i.e. the PC/laptop 115 or the thin client 120) by the application.

At steps 204-210. If the application is making use of deferred login, steps 204-210 proceed as in the previous variation (Variation 3). Otherwise, or in addition, messaging similar to steps 207-208 can be used by the application to query the association database 150 to obtain the IP phone MAC (or other unique ID pair), as previously stored in step 203 described above, as well as the mapping of computing device user ID to the equivalent IP phone user ID (such as the user's personal DN ("UserDN")). The application then uses these IDs to interact with the call controller 155 (or IP phone 110 directly) to control the device.

Variation 4b—Computing Device Uses Link Layer Protocol Directly.

Alternatively, the computing device may initiate the link layer protocol as above, and directly use the IP phone MAC and/or IP address (or other unique identifiers) obtained from a link layer message sent from the IP phone 110 towards the computing device. Initiation may be as a result of start-up or connection of the computing device, or start of the application. This embodiment assumes the IP phone 110 is also transmitting the link layer protocol from its end of the link towards the attached computing device (either PC/laptop 115 or thin client 120) (this messaging not shown in the FIG. 2). The application can then use these obtained IDs to interact with the call controller (or phone directly) to control the device, initiate a login, or for other purposes.

In embodiments of Variation 4b, the computing device may be the PC/laptop 115 that watches the link layer protocol directly, while in other embodiments the PC/laptop 115 may further comprise the application server 160 and/or the association database 150, and hence messages transmitted between these elements occur internally to the PC/laptop 115. In further embodiments of Variation 4b, the computing device may comprise the thin client 120 that watches the link layer protocol directly and communicate obtained IDs and/or other information to the related thin client server 125, while in other embodiments the thin client server 125 may further comprise the application server 160 and/or the association database 150, and hence messages transmitted between these elements occur internally to the thin client server 125.

While embodiments described use MAC addresses as device identifiers throughout, other types of device identifiers are within the scope of the present invention, as long as the device identifiers used are unique to the particular physical communication/computing device, and invariant. In some embodiments, each communication/computing device may use a different device identifier type. Further discussion of this appears below.

Furthermore, while embodiments described assume that user IDs exist corresponding to the same user in both the computing device subsystem (thin client 110/thin client server 125, or PC/laptop 115) and in the communication subsystem (call controller 155/IP phone 110), and that these user IDs can be collated to each other, the specific format of the user IDs is not important, as long as they are unique to the particular user, and invariant. The user IDs may be the same in each subsystem, or different. There are many ways to accomplish the collation of user IDs in each subsystem, including but not limited to:

The user IDs use the same approach, for example a simple, unique user name string, uniform user_id/password pair, SIP URI, in which case there is no collation needed.

Both user ID types may pre-exist in a separate database (e.g. in a corporate LDAP server), one keyed from the other or both from a common key, for example using user name as a key to extract the corresponding computing subsystem user_id/password as well as the communication subsystem Directory Number (DN) for that user.

There may be an algorithmic relationship, for example transforming a user name string to SIP URI and/or a computer system user_id, or form one to the other directly.

The collation between user IDs may be configured into the association database 150.

At steps 203, 207, and 208: association of devices IDs and user IDs may be stored separately in the association database 150 rather than as one record as shown. Also, there may be different databases and/or servers used for each association type. In these embodiments, step 203 remains the same (associating device IDs), while steps 207-208 would comprise separate query/response pairs for each of device ID association data and user ID association data. This makes no difference to the end result, other than increased messaging and different distribution of the data storage.

In many instances, physical location data may be available to the devices involved, for example by use of GPS or other positioning measurement technology, through link layer or higher layer protocol interactions (e.g. through Link Layer Discovery Protocol-Media Endpoint Discovery (LLDP-MED), DHCP, or HELD protocols), or through direct configuration. This information may take the form of civic address (city/street address/floor/room number), coordinate-based geographic location (latitude/longitude/altitude), or other locally relevant indices such as wiremap wall jack number, or similar. Where this information is available, it can also be added to the association database 150 information associated with a set of devices at the same physical location, using messaging such as the Neighbor_info message as described here. Where such information can be obtained for at least one associated device, it can then be used by applications as an index to determine and access some set of devices at a particular location, determine that some set of devices are (or are not) at the same location, or determine the set of all associated devices at a particular location.

Supplementary data supplied in the link layer protocol (e.g. LLDP-MED Inventory data), or configured directly into the communication devices, may be used either directly as part of the device association process (e.g. using unique device ID contained in that supplementary data, such as device DN or Asset Number), or may be used to modify the association process (e.g. only allow association of devices of particular make/model, or at particular software versions, known asset numbers, etc). This is not shown in the messaging described above with reference to FIG. 2, however is a straight-forward extension by passing this supplementary data in the Neighbor_info, Associate, Association_Query/Association_Query_response or other messaging.

Other variations on the messaging described may include, but are not limited to:

The IP phone 110 may interact directly with the association database 150 rather than via the call controller 155 to establish the device association (steps 202-203);

The IP phone 110 may interact directly with the application server 160 rather than via the call controller 155 to establish the device association (steps 202-203) and/or to initiate user login (steps 209-210);

Notification messages (e.g. steps 202, 205, and 206) may be implemented by a Subscribe/Notify pattern rather than as a one-way spontaneous event (for example as SIP Subscribe/Notify messages).

As in the general system description previously described, since each entity described is logical only, the functions may be arbitrarily combined. For example, the application server 160 and/or the association database 150 functions may be integrated in the thin client server 125, the call controller 155 may (in effect) be integrated in the IP phone 110 (e.g. a SIP phone device), etc.

Link Layer Discovery Via Computing Device

Embodiments where link layer discovery occurs via a communication/computing device (i.e. the PC/laptop 115 or the thin client 120) are now described. In these embodiments, it is assumed that the IP phone 110 is connected to the network via an embedded or attached L2 switch/bridge, similar to the L2 switch/bridge 145, in the desktop communication/computing device (i.e. the switch/bridge is integrated with PC/laptop 155 or thin client 120). This scenario is basically the inverse of the previously described embodiments, with the difference that the connectivity of the IP phone 110 is via the desktop communication/computing device, rather than visa-versa. (Note that the connectivity of this configuration is not specifically depicted in FIG. 1, but is a straight-forward extension.)

Figure 2:
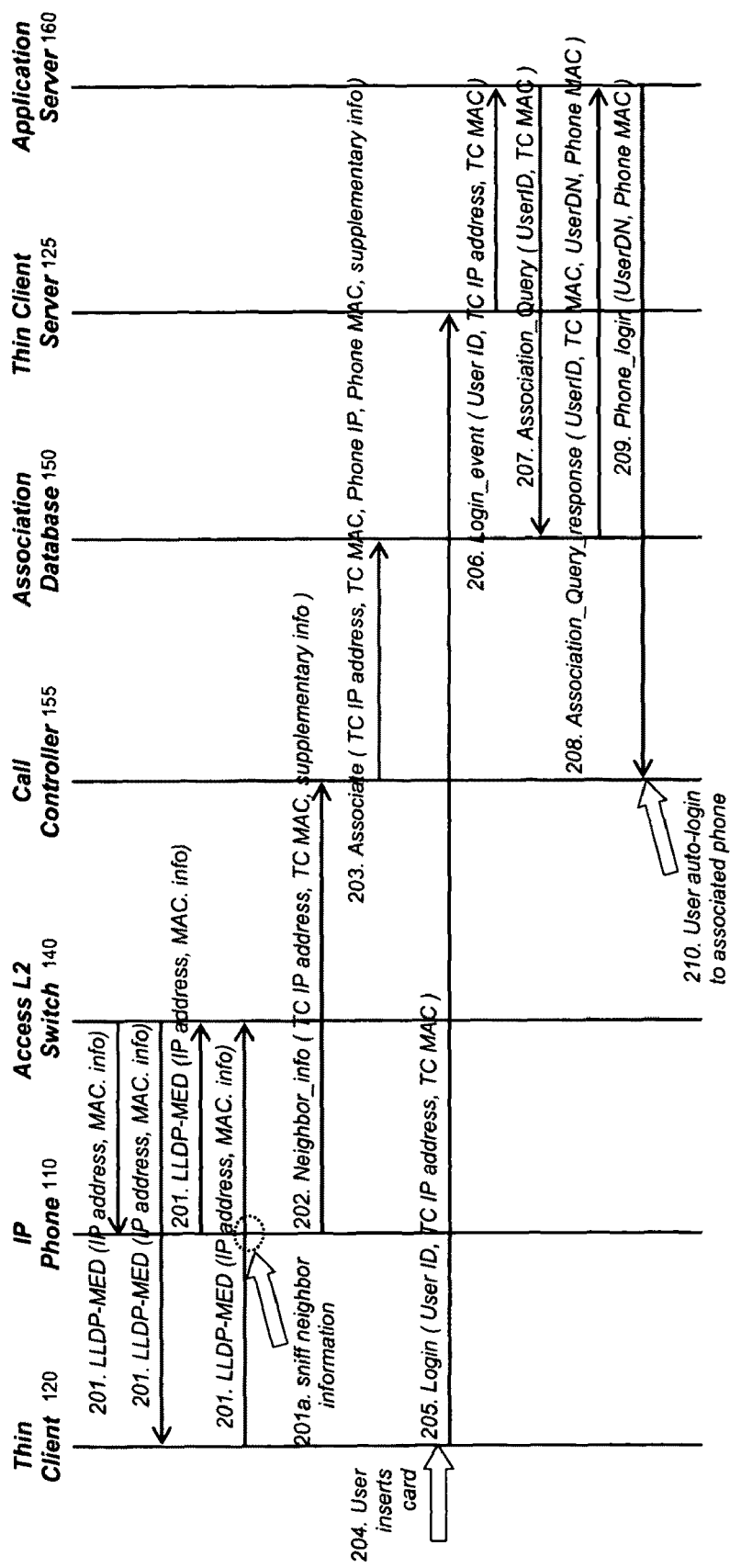
FIG. 2 depicts a message diagram for associating networked communication devices, according to a non-limiting embodiment.

In this method, the steps of Link Layer Discovery via the IP phone 110 are largely unchanged with reference to FIG. 2, with the following exceptions:

At step 201, LLDP-MED is passed to the network via L2 switch/bridge in (or associated with) the desktop communication/computing device.

At step 201a. LLDP-MED is "sniffed" at the desktop communication/computing device.

At step 202. The communication/computing device's neighbour information, regarding the attached IP phone 110, may be passed to a server other than the call controller 155 (e.g. directly to the application server 160). In the case of the thin client 120, the thin client server 125 would pass the information. In the case of the PC/laptop 115, the PC/laptop 115 would pass the information directly. In other embodiments, the interaction may still occur with the call controller 155 as previously described, for example in embodiments where the computing device can access facilities in the call controller for this purpose.

At step 203, collation of the association may be carried out in a server other than the call controller 155 such as in the application server 160, resulting in the Associate message being sent from that server to the association database 150, establishing the device association.

At step 204, in the IP Phone login case, the identification card 135 is inserted into the IP phone 110. Alternatively, in the computing device login case, the identification card 135 is inserted into the thin client 120 or PC/laptop 115. However, other login methods may occur as described previously.

At step 205, in the IP phone login case, this may result in a user Login message or equivalent being sent to the call controller 155, and as a result, the user is logged into the IP phone 110 and may begin using it. Alternatively, in the computing device login case, this may result in a Login message or equivalent sent from the thin client 120 to the thin client server 125, or actions internal to the PC/laptop 115, resulting in the user being logged in to the computing device.

At step 206, in the IP Phone login case, as a result of the login, a Login_event message or similar may be sent from the call controller 155 to the application server 160. Alternatively, in the computing device login case, as a result of the login, a Login_event message or similar may be sent from the thin client server 125 (in thin client embodiments) or directly from the PC/laptop 115 (in PC/laptop embodiments) to an application server 160.

At step 207, in the IP Phone login case, the auto-login application running on the application server 160 may then query the association database 150, passing in the IP phone MAC (or other unique device ID) and the logged in user's communication subsystem User ID as keys. Alternatively, in the computing device login case, the computing device MAC (or other unique device ID) and logged in user's computing subsystem User ID may be passed as keys.

At step 208, the association database 150 returns the mapping of the IP phone MAC to the computing device MAC (or other unique ID pair) as well as the mapping of IP phone user ID to the equivalent computing device user ID.

At step 209, in the IP Phone login case, the auto-login application on application server 160 may then send a control message to the thin client server 125 (in thin client embodiments) or to the PC/laptop 115 (in PC/laptop embodiments), requesting that the user be logged into the associated computing device, passing the computing device MAC address (or other unique device ID) and the user's User ID as known to the computing subsystem (e.g. the network user name/password). Alternatively, in the computing device login case, a control message may be sent to the call controller 155, requesting that the user be logged into the associated IP Phone, passing the IP Phone MAC address (or other unique device ID) and the user's User ID as known to the communication subsystem (e.g. the user's DN).

At step 210, in the IP Phone login case, the user is auto-logged into the associated computing device, and may begin using it. Alternatively, in the computing device login case, the user is auto-logged into the associated IP Phone, and may begin using it.

Link Layer Discovery Via Network Notification

Turning now to embodiments where link layer discovery occurs via network notification, it is assumed that the communication/computing device (the PC/laptop 115 or the thin client 120) may or may not connected to the network via the IP phone's 110 embedded L2 switch/bridge 145, or visa-versa. When not connected to the network via an embedded L2 switch/bridge, then the communication/computing devices each connect to different ports on the network access L2 switch 140 (Desktop B and D scenarios of FIG. 1). When connected on different access ports, it is assumed that there is some method available to know that the connections to these ports actually terminate at the same physical location (e.g. at the same wall jack, in the same conference room, etc), for example using a wiremap data or location data accessible by the network access L2 switch 140. For example, in some of these embodiments the wiremap data may be stored at the network access L2 switch 140, while in other embodiments, the wiremap data may be stored at the wiremap database 170, and the wiremap data is retrieved by the network access L2 switch 140 via a query through the data network 130. These embodiments are now described with reference to FIG. 3 which depicts a message diagram for associating networked communication devices, according to a non-limiting embodiment. Further reference is made to FIG. 1 using the Desktop A scenario, in which the thin client 120 is connected to the network access L2 switch 140 via the IP phone embedded L2 switch/bridge 145. Embodiments for Desktop B, C and D, scenarios using different connectivity and/or PC/laptop 115, are also described below.

In this method, the device association may proceed as follows (referring to the message diagram of FIG. 3):

Step 301. Similar to step 201 described above.

Step 302. Triggered by connection of the communication/computing devices to the network, and subsequent detection of LLDP-MED information on the links by the network access L2 switch 140 (or equivalently connection of the computing device to the IP phone embedded L2 switch/bridge 145 which simply passes the messages along), network link change of state events ("Notify_link_change") messages are generated from the network access L2 switch 140 to the application server 160, carrying the network access L2 switch 145 port ID and the connected device's IP addresses and MAC addresses. Similar messaging occurs for each connected communication device, carrying that communication device's individual IP address and MAC address, and the same network access L2 switch port ID. Any supplementary data carried by LLDP-MED messaging in the previous step may also be carried in the notification events.

Step 303. Since the Notify_link_change messages are from the same port ID (or equivalently, the notification arrives as a single message for all attached devices on that single port ID) the application server 160 is now able to collate the IP phone data with the computing device data, and sends an association message ("Associate") or equivalent to the association database 150, containing a mapping of computing device MAC address to IP phone MAC address (or other unique identifiers) and also the IP address of the computing device as well as that of the IP phone 110. Any supplementary data gathered from the previous step may also be carried. This association is stored in the association database 150 for later use by applications. Hence, the application server 160 effectively triggers the association between the devices by sending the association message. The device association phase is complete.

Step 304-310 are substantially similar to steps 204-210 described above.

Figure 3:
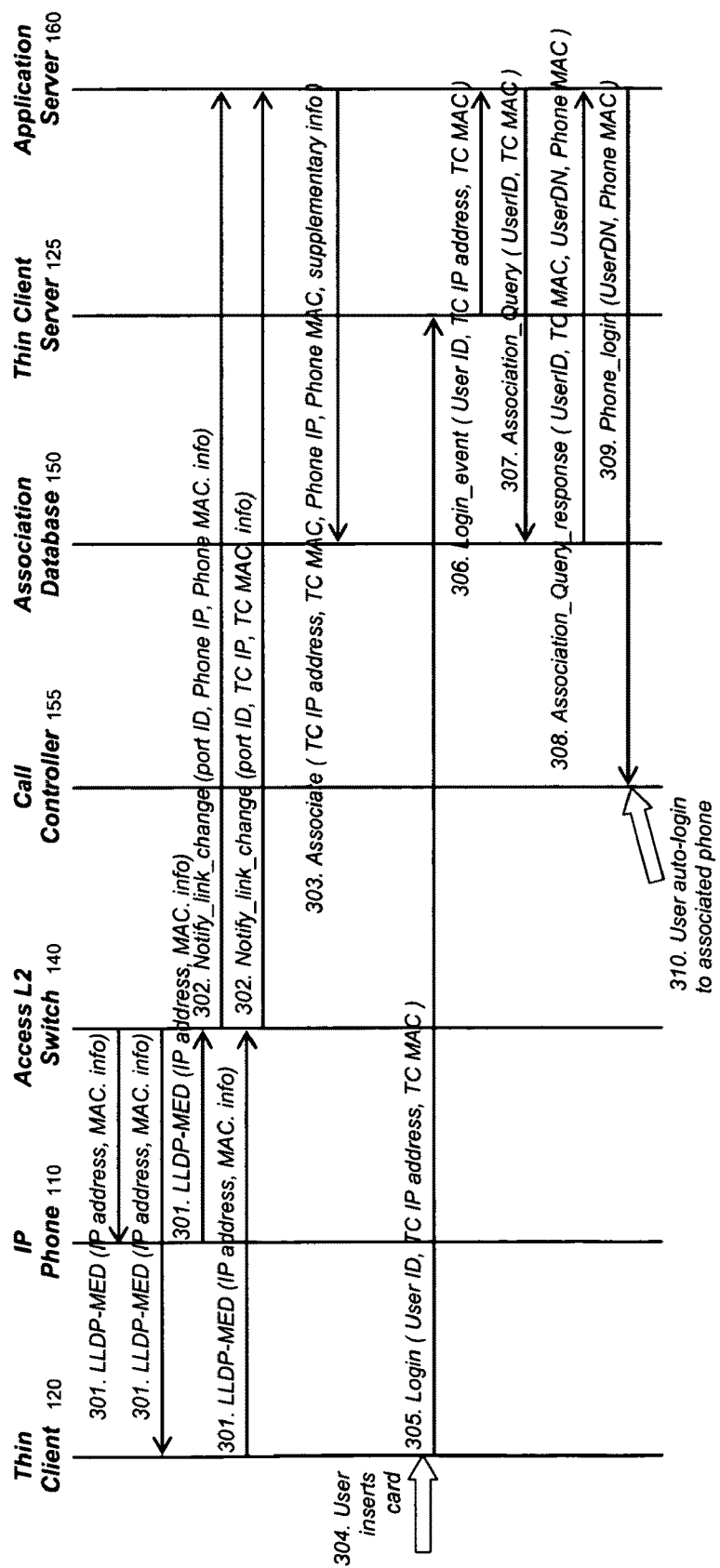
FIG. 3 depicts a message diagram for associating networked communication devices, according to a non-limiting embodiment.

Other variations on the messaging described with reference to FIG. 3 may include, but are not limited to:

- Step 302 may use multiple messages (one per attached device, as shown), or a single message (notifying regarding all devices attached);
- The notification protocol used in step 302 may be SNMP (as defined in LLDP-MED), or another suitable protocol.
- Step 302 may be implemented in multiple steps e.g. by a more primitive notification from the network access L2 switch to the application server 160, for example simple port LinkUp/LinkDown notifications (e.g.) using SNMP Bridge MIB (Management Information Base) or similar, which the application server 160 then uses to trigger one or more queries for more specific data on the notified port(s). The more specific queries may, for example, use LLDP-MED defined SNMP MIBs or other similar query formats.

Variations for Devices Connected on Different Ports

In further variations on above methods, the computing device (thin client 120 or PC/laptop 115) and IP phone 110 may be connected to different network access L2 switch ports (i.e. not connected via an embedded L2 switch/bridge on either, as shown in FIG. 1 Desktop B or D). In this case, then the collation of step 303 above can use any of several methods to collate the information. For example:

Step 303a. The application server 160 may contain or have access to the wiremap database 170, which contains mappings of access switch port ID to physical location data related to the termination of the port (e.g. to room number, wall jack identifier, etc). The collation can then be based on matching termination location. Note that in many applications it is adequate to be able to determine that the port IDs correspond to the same physical location, not necessarily what that specific location is. Also, where non specific indices are used (such as a wall jack identifier), and the identifiers are not the same, it may be possible to determine that these identifiers do in fact map to the same physical location by performing further queries to the wiremap database 170, for example by querying the mapping of each wall jack identifier to a physical location for each, then matching returned physical location information. Once such collations are made, then the Associate message from the application server 160 to the association database 150 may be formed and sent.

Step 303b. The network access L2 switch 140 may be configured to contain physical location information associated with each port (e.g. as defined by LLDP-MED), for example giving geographic location coordinates, civic address coordinates, room number, wall jack identifier, etc. This location information may then be queried by the application server 160 upon receipt of the notifications (e.g. using SNMP as enabled by LLDP-MED), or equivalently supplied directly as part of the notification(s). The collation can then be based on matching network access L2 switch location data.

Other variations on these embodiments, similar to embodiments described above with reference to FIG. 2 are within the scope of the present specification. These include, but are not limited to:

- Any network element, such as the call controller 155, the thin client server 125 or the PC/laptop 115, may act as (or comprise) the application server 160 and/or the association database 150.
- Any or all of the messages shown as being spontaneous events (e.g. messages 301, 302,) may be implemented as a Subscribe/Notify interaction.
- Supplementary information such as User ID, may also be carried directly in the link layer protocol messaging (messages 301), as well as in link change notification (message 302) and in Associate messages (303), thus updating the association database 150 with associated user data valid at the time of device association.

Link Layer Discovery Via Network Query

Embodiments where link layer discovery occurs via a network query are now described. In some of these embodiments, the communication/computing device (e.g. the PC/laptop 115 or the thin client 120) is connected to the network via the IP phone's 110 embedded L2 switch/bridge 145 (or visa-versa), as in Desktop Scenarios A and C in FIG. 1. In other embodiments, each device is connected to different ports on the network access L2 switch 140, as in Desktop Scenarios B and D. When connected on different access ports, it is assumed that there is a method available to know that the connections to these ports actually terminate at the same physical location (e.g. at the same wall jack), for example using a wiremap data or location data accessible by the network access L2 switch 140. For example, in some of these embodiments the wiremap data may be stored at the network access L2 switch 140, while in other embodiments, the wiremap data is stored at the wiremap database 170, and the wiremap data is retrieved by the network access L2 switch 140 via a query through the data network 130. These embodiments are now described with reference to FIG. 4 which depicts a message diagram for associating networked communication devices, according to a non-limiting embodiment. Further reference is made to FIG. 1 using the Desktop A scenario, in which the thin client 120 is connected to the network access L2 switch 140 via the IP phone embedded L2 switch/bridge 145. Embodiments for Desktop B, C and D, scenarios using different connectivity and/or PC/laptop 115, are also described below.

In this method, device association may proceed as follows (referring to the message diagram of FIG. 4):

Step 401. Similar to Step 201, described above.

Figure 4:
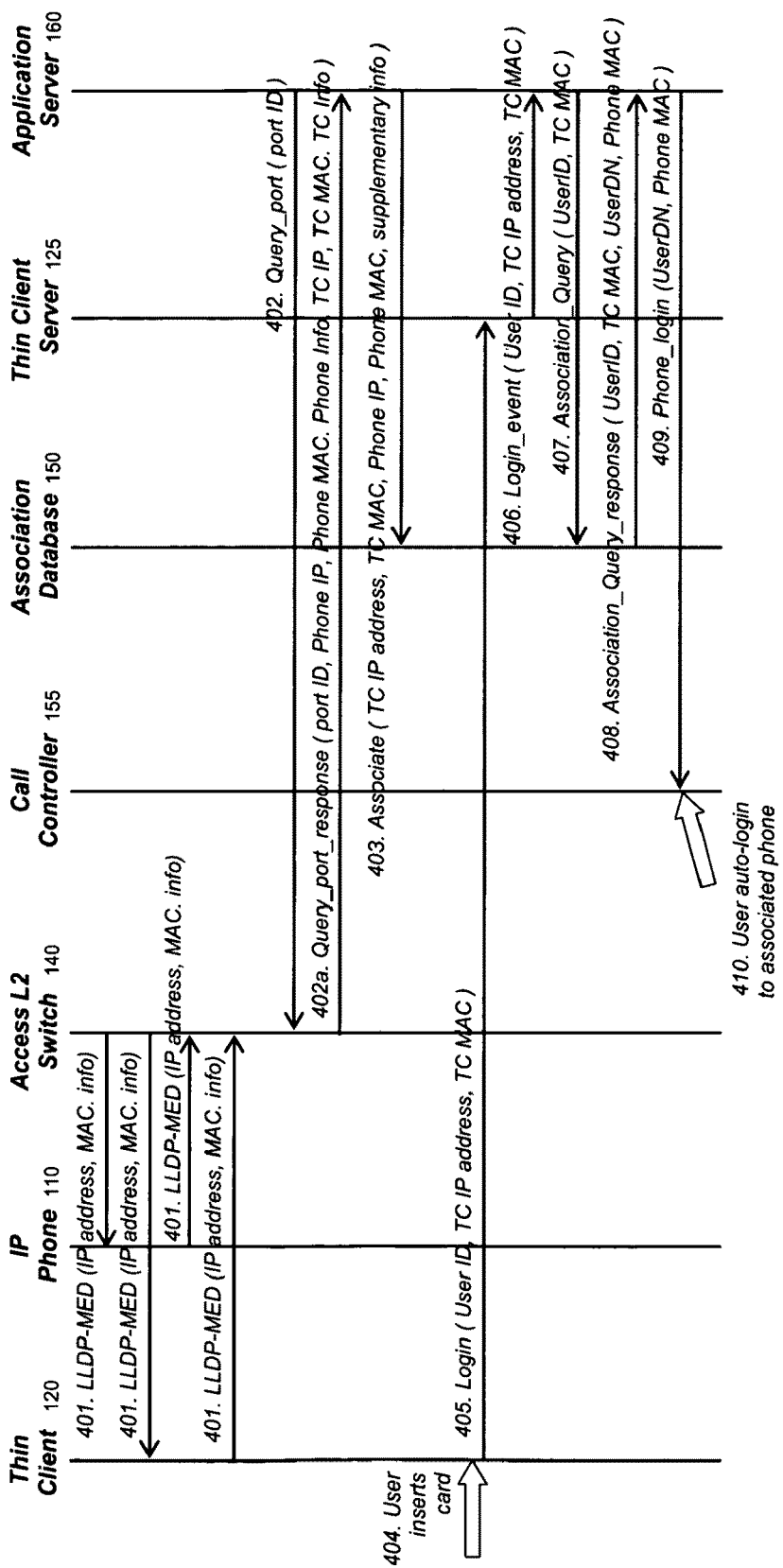
FIG. 4 depicts a message diagram for associating networked communication devices, according to a non-limiting embodiment.

Step 402. The application server 160 periodically polls the network access L2 switch 140 ("Query_port") on an ongoing basis to detect changes in connected devices at the network access L2 ports. It is noted that while only one poll is depicted in FIG. 4 for the sake of clarity, there would in general be a plurality of Query_port polls, occurring periodically, or as triggered by the application server 160. Alternatively, in embodiments where all devices are understood to be non-mobile, a single query as shown may suffice.

Step 402a. The network access L2 switch 140 responds ("Query_port_response") carrying the network access L2 switch port ID and the connected device's IP addresses and MAC addresses for each port. In cases where more than one device is attached to the port, then the returned response may contain data related to each device, or multiple response messages may be used.

Step 403. Since the Query_port_response messages are from the same Port ID (or alternatively, the responses arrives as a single message for all attached devices on the port) the application server 160 is now able to collate the communication/computing device's data with the IP phone's data, and sends an association message or equivalent to the association database 150, containing a mapping of computing device MAC address to IP phone MAC address (or other unique identifiers) and also the IP address of the computing device as well as that of the IP phone. This association is stored in the association database 150 for later use by applications. Hence, the application server 160 effectively triggers the association between the devices by sending the association message. The device association phase is complete.

Steps 404-410 are substantially similar to steps 204-210 described above.

Variations on the messaging described with reference to FIG. 4 may include, but are not limited to:

To gather information on each device attached to a particular port on a network access L2 switch 140, steps 402-402a may use multiple message pairs (one query/response per device on the port), or a single message pair (providing bulk information on all attached devices on that port);

To gather information on each port on a network access L2 switch 140, steps 402-402a may use multiple message pairs (one query/response per port, or as above one query/response per device per each port), or a single message pair (providing bulk information on all device on all attached ports);

The query/response protocol in steps 402-402a may be SNMP (e.g. as defined in LLDP-MED), or any other suitable protocol.

Rather than polling, Step 402-402a may also be triggered, for example by a more primitive notification from the network access L2 switch 140 to the application server 160, for example simple port LinkUp/LinkDown notifications (e.g.) using SNMP Bridge MIB, or similar, which the application server 160 may then use to trigger one or more queries for more specific data on the notified port(s). The more specific queries may (e.g.) use LLDP-MED defined SNMP MIBs, and the like.

The start of the querying which occurs at Step 402 from the application server 160 to network access L2 switch 140 may be triggered by messaging from the call controller 155 (alternatively directly from the IP phone 110), or from the computing device (either the laptop/PC 115 the thin client server 125) to the application server 160. Any number of methods may be used for this messaging, for example an SNMP notification event, the specific method being immaterial here. The triggering message may possibly (but not necessarily) also supply the specific switch port ID to be queried. To improve polling efficiency, this triggering message may be sent at an appropriate time such as follows:

the IP phone 110 and/or computing device (115, 125) may notify an application server 160 to begin polling at initial network connection time;

the call controller 155 (or the IP phone 110 directly) may notify an application server 160 to begin polling upon successful registration of an if P phone 110 to the call controller 155;

the call controller 155 (or the IP phone 110 or the PC/laptop 115 or the thin client 120, or the thin client server 125) may begin polling upon successful login of a user to an IP phone 110 (or to the PC/laptop 115 or the thin client 120).

Variations for Devices Connected on Different Ports

In further variations on the above described methods, the computing device (the thin client 120 or the PC/laptop 115) and IP phone 110 may be connected to different network access L2 switch ports (i.e. not connected via the embedded L2 switch/bridge 145 on either, as shown in FIG. 1 Desktop Scenarios B or D). The variations on methods based on Link Layer Discovery via Network Query as described immediately above are similar to those previously described under the heading Variations for Devices Connected on Different Ports under the description of methods based on Link Layer Discovery via Network Notification, as previously described.

Other variations on these embodiments, similar to embodiments described above with reference to FIGS. 2 and 3 are within the scope of the present specification.

Device and User Disassociation

Attention is now directed to embodiments where the previously established associations are undone. For example, at least one associated device may no longer be in communication with the data network 130 due to it being powering off or disconnected. In another example, a user may log-off from one or more of the devices and the previously established associations with other devices is no longer valid. Processes of disassociation may hence resolve privacy issues and other security concerns, resource consumption and/or abuse issues.

The following embodiments to achieve disassociation of devices are described with reference to those previously described. Indeed, each embodiments described below for disassociation corresponds to an above described association method.

Device Disassociation Using Link Layer Discovery Via a Device

Embodiments where device disassociation occurs using link Layer discovery via the IP phone 110 are now described, with extensions to equivalent methods using discovery via the computing device (e.g. the PC/laptop 115 or the thin client 120). These embodiments are in essence the reverse of those described above with reference to FIG. 2, for the corresponding device association. While the following is described with reference to FIG. 2, it is understood that a method of disassociation is described using similar messaging to that depicted in FIG. 2. When an attached computing device (e.g. the PC/laptop 115 or the thin client 120 and/or the IP phone 110) is disconnected or powered off, or the relevant application is closed, there are two cases corresponding to messages 201-203 of FIG. 2.

Case A—Passive

Step 201. As a result of disconnection, power off, or application close, LLDP-MED (or equivalent) messaging ceases from the computing device towards the network access L2 switch 140, and hence the IP phone 110 and its embedded L2 switch/bridge 145 as well.

Step 201a. Hence, as a result of the messaging ceasing, the corresponding neighbour information in the IP phone 110 (sniffing the messaging) is aged out and becomes invalid.

Case B—Active

Step 201. At power off or application close, an explicit link layer message from computing device towards the network access L2 switch 140 may be sent indicating the device is no longer in use.

Step 201a. The explicit link layer message indicating the device is no longer in use is sniffed by the IP phone 110. In these embodiments, the IP phone 110 is enabled to invalidate the corresponding neighbour information.

Hence the disassociation of the devices may be detected either via Cases A or B. After this, the following may occur:

Step 202. When the upstream device information is invalidated by either Case A or Case B, a new Neighbor_info message is sent to the call controller 155, indicating that the upstream device is no longer active.

Step 203. As a result, a new Associate message is sent from the call controller 155 to the association database 150, the new Associate message enabled to trigger the removing or invalidating the corresponding device association at the association database 150 (in essence a disassociation message).

Device disassociation may also occur in embodiments using link layer discovery via the desktop computing device. These embodiments of disassociation are similar to those described above, with the exception that the LLDP-MED messaging (or equivalent) is ceased from the IP phone 110 towards the network and computing device (Step 201 Case A), or an explicit message sent (Step 201 Case B), and the Neighbor_info message indicating change of device connectivity is sent to the application server 160 from the computing device (i.e. from the PC/laptop 115, from the thin client 120, or from the thin client server 125), rather than from the call controller 155 or the IP phone 110 (Step 202). The Associate message indicating removal of the association would then be sent from the application server 160 to the association database 150 (Step 203).

Device Disassociation Using Link Layer Discovery Via Network Notification

Embodiments where device disassociation occurs using link layer discovery via network notification are now described. These embodiments are in essence the reverse of those described above with reference to FIG. 3, for the corresponding device association. While the following is described with reference to FIG. 3, it is understood that a method of disassociation is described using similar messaging to that depicted in FIG. 3. When an attached device (e.g. the PC/laptop 115, the thin client 120 and/or the IP phone 110) is disconnected or powered off, or the relevant application is closed, there are two cases corresponding to messages 301-303 of FIG. 3.

Case A—Passive

Step 301. As a result of disconnection, power off, or application close, LLDP-MED (or equivalent) messaging ceases from the computing device (or alternatively from the IP phone 110) towards the network access L2 switch 140. As a result of lack of advertisements from the computing device or the IP phone 110, the corresponding information contained at the network access L2 switch 140 is aged out and invalidated.

Case B—Active

Step 301. At power off or application close, an explicit link layer message may be sent from the computing device (or alternatively from the IP phone 110) to the network access L2 switch 140 indicating the device is no longer in use. This message triggers an invalidation of the corresponding upstream device information at the network access L2 switch 140.

Hence the disassociation of the devices may be detected either via Cases A or B. After this, the following may occur:

Step 302. When the device information at the network access L2 switch 140 is invalidated, as a result of the change, a new Notify_link_change message may be sent to the application server 160, indicating that the upstream device is no longer active.

Step 303. As a result, a new Associate message is sent from the application server 160 to the association database 150, the new Associate message enabled to trigger the removing or invalidating the corresponding device association at the association database 150 (in essence a disassociation message).

Device Disassociation Using Link Layer Discovery Via Network Query

Embodiments where device disassociation occurs using link layer discovery via network query are now described. These embodiments are in essence the reverse of those described above with reference to FIG. 4, for the corresponding device association. While the following is described with reference to FIG. 4, it is understood that a method of disassociation is described using similar messaging to that depicted in FIG. 4. When an attached device (e.g. the PC/laptop 115, the thin client 120 and/or the IP phone 110) is disconnected or powered off, or the relevant application is closed, there are two cases corresponding to messages 401-403 of FIG. 4.

Case A—Passive

Step 401. As a result of disconnection, power off, or application close, LLDP-MED (or equivalent) messaging ceases from the computing device (or equivalently from the IP phone 110) towards the network access L2 switch 140. As a result of lack of advertisements from the computing device or the IP phone 110, the corresponding information contained at the network access L2 switch 140 is aged out and invalidated.

Case B—Active

Step 401. At power off or application close, an explicit link layer message is sent from the computing device (or equivalently from the IP phone 110) to the network access L2 switch 140 indicating the device is no longer in use. This message triggers an invalidation of the corresponding upstream device information at the network access L2 switch 140.

Hence the disassociation of the devices may be detected either via Cases A or B. After this, the following may occur:

Steps 402-402a. At the next polling interval, when Query_port is sent from the application server to the network access L2 switch, the returned Query_port_response indicates the invalidated device(s) is no longer active. In some embodiments, this may comprise an absence of information for that device, while in other embodiments, this may comprise explicit indication that the device is now inactive.

Step 403. As a result, a new Associate message is sent from the application server 160 to the association database 150, the new associate message enabled to trigger the removing or invalidating the corresponding device association at the association database 150 (in essence a disassociation message).

User Level Disassociation

In some of the above described embodiments of device association, once the device-level disassociation is accomplished, the user is also dissociated, for example to automatically logoff the user from some or all of the formerly-associated devices. In some of these embodiments, a corresponding user-level action on all associated devices occurs as a result of user action taken at one of those devices, for example to logout from some or all as a result of logout from any. Hence, in a hotdesk environment, if a logout occurs at one device, a logout may occur at other devices in the hotdesk association.

Two embodiments of disassociating the user are now described, Case A and Case B, however other embodiments are within the scope of the present invention. While the following is described with reference to FIG. 2, it is understood that embodiments of disassociating the user use similar messaging to that depicted in FIG. 2.

Case A—Device Disassociation Driven

If the disassociation is physical (device disconnected, powered off or application closed, as in previously described scenarios) then device disassociation is detected at the application server 160 (see previous sections on disassociation methods, and specifically steps 203, 303 and 403).

Triggered by the physical device disassociation, in the case of computing device disconnection, the application server 160 can then send a logout message (not depicted) to the call controller 155, logging the corresponding user out from the corresponding IP phone. Referring to steps 204-210 in FIG. 2 (and, similarly, Steps 304-310 in FIG. 3 and Steps 304-310 in FIG. 4), this process can proceed by the following steps:

Steps 207-208. The application server 160 retrieves the association data corresponding to the user of the newly disconnected device, using the computing device-relevant user ID as a key. The corresponding user ID as used in the call controller 155 (UserDN) is extracted from the response.

In some embodiments, however, the device ID may also be needed for logout. In these embodiments, the association database 150 may temporarily maintain an association between devices until user logout occurs. For example, the association data base 150 may maintain a record of the devices being disassociated even though the same user is still logged into the devices.

Step 209. A Phone_logout message (equivalent to Phone_login in the message diagrams) is sent from the application server 160 to the call controller 155, containing the extracted user ID (UserDN). (Note that in some embodiments, the phone MAC may not be needed in this message, since the call controller 155 already knows which physical IP phone the user is logged into.)

Step 210. The user is then logged out from the IP phone 110 by call controller 155.

Further variations on Case A are as follows:

Alternatively, if the initial disconnect/power off/application close was initiated from the IP phone 110, then the user association query may be regarding the computing device user ID, and the corresponding logout message may be sent from the application server 160 to the thin client server 125 (or directly to the PC/Laptop 115), causing the computing device to logout the user at that device instead.

The physical device association data may be completely removed from the association database 150, or may be marked as inactive and remain cached in the association database for later use when the removed device is reconnected. If a new connection or power-on is detected at a later time, then the device association must again be re-established as previously described, but may make use of any previously cached data to assist this process.

At step 303 (or 403, or 503) as described previously for device disassociation, prior to sending the Associate message to remove the device association from the association database 150, the application server 160 may pre-query the existing association data from the association database 150 following steps similar to steps 307/308, and retain that data for later us in user-level disassociation process as above.

Equivalently to the above variation, at step 303 (or 403, or 503), the Association message may have a corresponding response message back from the association database 150 to the application server 160, indicating the device association data removed, including all formerly associated device IDs or other data needed to perform the user-level disassociation process as above.

Case B—User Action Driven

If the user logs off at one of the associated devices (but not disconnected or powered off) or takes some other action to terminate the user-level session at that device (e.g. the application is closed), then the equivalent user logoff or other action may need to be taken at the other associated devices. In this case, the physical association may remain in the association database for later use, since the devices themselves are still in the same relationship.

Triggered by a user action on one device, in the case of computing device logout, the application server 160 can then send a logout message to the call controller, logging the corresponding user out from the corresponding IP phone. Referring to steps 204-210 in FIG. 2 (and, similarly, Steps 304-310 in FIG. 3 and Steps 304-310 in FIG. 4), this process can proceed by the following steps:

Step 204. User removes their identification card 135 from the thin client 120, or logs off in some other way. In the PC/laptop case, the card may be removed or other logoff action taken at a PC/laptop 115.

Step 205. As a result the thin client 120 may then send a logout message or equivalent to the thin client server 125. This may be similar to the Login message sent at this step during device association and auto-login previously described.

Step 206. The thin client server 125 may then send an event message indicating the user logout to the application server 160. In the PC/laptop case, a similar message may be sent directly from the PC/laptop 115 to the application server 160. This may be similar to the Login_event message sent at this step during device association and auto-login previously described.

Steps 207-208. The application server 160 retrieves the association data corresponding to the user of the newly logged out device, using the computing device-relevant user ID as a key. The corresponding user ID as used in the call controller 155 (e.g. User DN) is extracted from the response.

Step 209. A Phone_logout message (equivalent to Phone_login in the message diagrams) is sent from the application server 160 to the call controller 155, containing the extracted user ID (e.g. User DN). (Note that the phone MAC may or may not be needed in this message, since the call controller 155 already knows which physical phone the user is logged into.)

Step 210. The user is logged out from the IP phone 110 by call controller 155.

Further variations on Case B are as follows:

Alternatively, if the initial log off was initiated from the IP phone 110, then the logout event will be via the call controller 155 (or directly from the IP phone 110) to the application server 160, the user association query will be regarding the computing device user ID, and the corresponding logout message is sent from the application server 160 to the thin client server 120 (or to the PC/Laptop 115), causing the computing device to logout the user at that device instead.

The physical device association data may remain in the association database 150 for later use when a new (possibly same) user again logs into one of the associated devices. In some embodiments, the physical association may only be destroyed or marked inactive only if there is a physical disconnect or power-off detected. If a new connection or power-on is detected at a later time, then the device association must again be re-established as previously described.

Further variations applicable to both Case A and Case B are as follows:

Both cases above are equally applicable to PC/laptop scenarios, in which case the corresponding messages would be sent and received by the PC/laptop 115 directly, rather than by the thin client server 125. Messages previously described as between thin client 120 and thin client server 125 would instead be internal to the PC/laptop 115.

Alternative Embodiments

There are a further alternatives to the previous embodiments described with reference to FIGS. 1 through 4, including, not limited to:

Embodiments are not limited to LLDP-MED being used as the link layer protocol, and any other could be used where sufficient information is provided for the association. Non-limiting examples of such protocols include Spanning Tree Protocol (STP) or proprietary protocols such as Cisco Discovery Protocol (CDP).

While non-limiting examples have described on thin client scenarios, all methods described are equally applicable to PC/laptop scenarios. In these cases all corresponding messages would be sent and received by the PC/laptop 115 directly, rather than by the thin client server 125. Messages described as between thin client 120 and thin client server 125 would instead be internal to the PC/laptop 115.

While non-limiting examples have described the application of auto-login/logout across multiple devices, these are primarily described to demonstrate workability of the device association steps to facilitate such applications. A great many other applications are within the scope of the present specification, including but not limited to: association of a telephony keypad ("TKB") to a PC-based Attendant Console application; association of a PC adjunct telephony device (e.g. Mitel Navigator from Mitel Networks, 350 Legget Drive P.O. Box 13089, Kanata, Ontario, Canada K2K 2W7) to the attached PC running the control application. Indeed, no login/logout actions may be needed for many applications. For example, simply plugging in a device may automatically make it available even though no user login has occurred on any device.

While the above described embodiments comprises only two devices to be associated (or disassociated), an arbitrary number of devices may be associated, as long as connectivity between them is established through one of the devices (e.g. via a multi-port embedded L2 switch, similar to the L2 switch/bridge 145 in the Desktop A and Desktop C scenarios), or sufficient mapping or location data is available to associate multiple network access L2 switch ports with each other (similar to the network access L2 switch ports described in the Desktop B and Desktop D scenarios).

Aspects of the association methods described with reference to FIGS. 1 through 4 may be used concurrently in the association of multiple devices.

While described embodiments have referenced MAC address as a physical device identifier in related messaging, other identifiers are within the scope of the present invention. Indeed, any unique, invariant identifier of the physical device will suffice for the purpose. Non-limiting examples of identifiers include: UUIDs (Universally Unique Identifier), asset numbers, serial numbers, and physical device DN (directory number). As well, associated devices are not limited to using the same type of identifiers, and each device may use a different identifier type, as long as the identifiers remain unique to the specific.

While described embodiments have referenced wired network environments, wireless (e.g. WiFi, Bluetooth) networks can support equivalent methods, either using LLDP-MED or other equivalent protocols.

While described embodiments have referenced association of IP phones with desktop computing devices, the device associations may apply to any devices which are co-located in such a way that they should be associated to each other from the user or administrative perspective. Further examples include but are not limited to:

IP phone and adjunct units connected to the IP phone, or in close proximity, such as conference units, video cameras, busy lamp fields, etc.;

a plurality of computing and/or entertainment devices to be used in conjunction, such as PC/laptop, audio/video appliances, game controllers;

co-located computing devices, such as servers, cooperating in a common application, for example to implement multi-server clusters in a data center;

collaborative applications;

cluster computing/data centers; and any combination of the above.

Device association (co-location detection) described in above embodiments, is a form of proximity detection as the association has determined that the devices are in the same location. As indicated previously, this enables the sharing of location information. However even in the absence of specific location information, the knowledge of proximity is useful. For example, devices that are involved in a collaboration application may use knowledge of proximity to modulate the application activity to select the most appropriate behaviour to perform or the most appropriate options to offer their users. In the prior art, communication devices supporting collaboration applications have features that are based on the assumption that users are distant from each other. Certain aspects of these features may be unsuited to the case in which users are proximate. For example, a computer or other device that is opening a session with another device for purposes of collaboration may refrain from offering the option of voice or video sessions if the users are proximate. This strategy assumes that the device's user wishes to share data with the proximate user and does not need to be bothered with unnecessary and un-useful options. Another example would occur in the displaying of data, the local displaying of confidential information could be suppressed if it is known that the devices of unauthorised users are present and the explicit permission of the user for this display requested. However, in general the network element which monitors and/or triggers the association, can be further enabled to trigger the availability of an application on a communication device, based on data associated with a co-located communication device once the communication devices are determined to be co-located. For example, once the communication devices are determined to be co-located, the network element could determine permissions associated with a first communication device (e.g. based on permissions stored at a database etc.) and make certain applications available at a second co-located communication device based on these permissions. In another example, data, such as personal information management (PIM) data stored in association with the first communication device could be made available to the second co-located communication device.

However, it should not be assumed that the communication devices that are being associated either belong to or are assigned to a single user; although that may be the case. As indicated above the communication devices may belong to multiple users and the discovery of an association provides information about co-location or proximity which can be used to trigger the operation of features or to modulate the behaviour of features. The example of the sharing of location information among communication devices described above is that of a feature whose behaviour can be triggered and modulated by the co-location or proximity information. A notification that is triggered when the proximity of a specific user is discovered is another example of feature triggering by co-location. Other features such as the session initiation feature described above can be triggered by a user but the behaviour can be modulated with knowledge that the called user is co-located or proximate to the originating user.

Furthermore, in other embodiments, the co-location or proximity information that is encoded in the association database 150 may be further published to a presence server or a special purpose proximity server, where it will be available to trigger and/or modulate feature operation. In some embodiments, publish-subscribe model of such servers may be used for this purpose.

In some embodiments, the association database 150 may comprise a proximity database. Features which require information about communication devices (and by implication their users) that are proximate or near-by another communication device (and its user) can query the association database 150 or the proximity database to determine this information. This information may also be published to a presence server as proximity information for the user and his/her devices.

Furthermore, while the described embodiments refer to operation of a single application, association information can also be used for context to determine the appropriate behaviour of a plurality of applications and/or a plurality of communication devices in the case of collaboration.

In addition, in some embodiments, devices may not be associated with any particular user, or may not associated with any user at all, e.g. the devices may be: computing equipment in a shelf, implementing cooperating applications or server clustering; a vending machine, a store location etc. of interest to the user; an automaton; a device implementing a user tracking application; and/or a device implementing an asset tracking application, etc.

Those skilled in the art will appreciate that in some embodiments, the functionality of the PC/laptop 115, the IP Phone 110, the thin client 120, the thin client server 125, the network access L2 switch 140, the L2 switch 145, the association database 150, the call controller 155 and/or the application server 160 may be implemented using pre-programmed hardware or firmware elements (e.g., application specific integrated circuits (ASICs), electrically erasable programmable read-only memories (EEPROMs), etc.), or other related components. In other embodiments, the functionality of the PC/laptop 115, the IP Phone 110, the thin client 120, the thin client server 125, the network access L2 switch 140, the L2 switch 145, the association database 150, the call controller 155 and/or the application server 160 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method of associating at least two communication devices coupled to a data network, comprising,
   receiving first information identifying a first communication device and second information identifying a second communication device via a link layer protocol over the data network;
   determining if said first communication device and said second communication device are co-located in physical proximity to each other based on first link layer data associated with said first communication device and second link layer data associated with said second communication device;
   triggering an association between said first information and said second information if said first communication device and said second communication device are determined to be co-located;
   triggering availability of at least one of an application and a feature at, at least one of said first communication device and said second communication device based on data associated with the other of said second communication device and said first communication device, if said first communication device and said second communication device are determined to be co-located; and
   storing the association of the two devices in a database, wherein the association enables a user to be identified with both devices and share applications between the devices.

2. The method of claim 1, wherein said application comprises an auto-login application and said data associated with the other of said first communication device and said second communication device comprises log-in data.

3. The method of claim 1, further comprising triggering a disassociation between said first information and said second information if said association is determined to have become invalid.

4. The method of claim 1, wherein at least one of said first link layer data and said second link layer data comprises a port ID identifying a port over which an associated communication device is communicating, the associated communication device comprising at least one of said first communication device and said second communication device.

5. The method of claim 1, wherein said determining if said first communication device and said second communication device are co-located comprises comparing said first link layer data and said second link layer data.

6. The method of claim 1, wherein said determining if said first communication device and said second communication device are co-located comprises looking up said first link layer data and said second link layer data in a wiremap database to determine a physical location of said first communication device and said second communication device.

7. The method of claim 1, further comprising querying link layer data, said receiving said first link layer data and said second link layer data and said receiving said first information and said second information occurring in response to said querying.

8. The method of claim 1, wherein said triggering an association between said first information and said second information comprises transmitting a message comprising said first information and said second information, said message configured to trigger associating said first information and said second information in at least one database.

9. The method of claim 1, wherein said link layer protocol comprises at least one of LLDP, LLDP-MED, CDP and STP.

10. The method of claim 1, further comprising sharing location information between at least one of said first communication device and said second communication device.

11. A system for associating at least two communication devices comprising,
- a first communication device;
- a second communication device co-located in physical proximity with said first communication device;
- a data network for conveying information associated with at least one of said first communication device and said second communication device;
- at least one network access switch connecting at least one of said first communication device and said second communication device to said data network via a link layer;
- at least one server coupled to said data network, said at least one server enabled for:
- receiving first information identifying a first communication device and second information identifying a second communication device over the data network;
- determining if said first communication device and said second communication device are co-located in physical proximity to each other based on first link layer data associated with said first communication device and second link layer data associated with said second communication device;
- triggering an association between said first information and said second information if said first communication device and said second communication device are determined to be co-located;
- triggering availability of an application at, at least one of said first communication device and said second communication device based on data associated with the other of said second communication device and said first communication device, if said first communication device and said second communication device are determined to be co-located; and
- storing the association of the two devices, wherein the association enables a user to be identified with both devices and share applications between the devices.

12. The system of claim 11, wherein said first communication device is connected to said data network via a first link layer port having a first port ID, and said second communication device is connected to said data network via a second link layer port having a second port ID.

13. The system of claim 11, wherein at least one of said first communication device and said second communication device comprises at least one of a link layer switch hub and repeater, and said first communication device and said second communication device are connected via said at least one of a link layer switch hub and repeater.

14. The system of claim 13, wherein said at least one of a link layer switch hub and repeater is enabled to detect neighbour information and transmit a neighbour information message comprising said first information and said second information to said at least one server.

15. The system of claim 11, wherein each of said first communication device and said second communication device comprises at least one of a thin client device, a personal computer, a laptop, a personal digital assistant, a cell phone, and a game console, and an IP enabled telephone.

16. The system of claim 11, further comprising at least one database in communication with said at least one server for storing an association information.

17. A method of associating a first communication device with a second communication device connected to each other via a data network, the method comprising,
- receiving an information identifying the first communication device at the second communication device via a link layer protocol over the data network;
- triggering an association between the first communication device and the second communication device;
- triggering availability of at least one of an application and a feature at one of said first communication device and said second communication device based on data associated with the other of said second communication device and said first communication device, if said first communication device and said second communication device are determined to be co-located; and
- storing the association of the two devices in a database, wherein the association indicates that the first communication device and the second communication device are co-located in physical proximity to each other and enables a user to be identified with both devices and share applications between the devices.

18. The method of claim 17, wherein said application comprises an auto-login application.

19. The method of claim 17, wherein said triggering an association is comprised of:
- receiving a neighbor information message containing a first information identifying the first communication device and a second information identifying said second communication device; and
- determining that the first communication device and the second communication device are co-located based on the neighbor information message.

20. The method of claim 17, wherein the communication devices are connected to each other via a link layer protocol over the data network comprising at least one of LLDP, LLDP-MED, CDP and STP.

* * * * *